(12) United States Patent  
McKinstry et al.

(10) Patent No.: US 8,045,290 B2
(45) Date of Patent: Oct. 25, 2011

(54) TAPE HEAD LAYOUT HAVING OFFSET READ AND WRITE ELEMENT ARRAYS

(75) Inventors: Kevin D. McKinstry, Denver, CO (US); Francis Campos, Louisville, CO (US)

(73) Assignee: Oracle America, Inc., Redwood City, CA (US)

( * ) Notice: Subject to any disclaimer, the term of this patent is extended or adjusted under 35 U.S.C. 154(b) by 992 days.

(21) Appl. No.: 11/950,843

(22) Filed: Dec. 5, 2007

(65) Prior Publication Data

US 2009/0147395 A1 Jun. 11, 2009

(51) Int. Cl.
*G11B 5/48* (2006.01)

(52) U.S. Cl. .................. 360/121; 360/77.12; 360/78.02

(58) Field of Classification Search ............... 360/121, 360/77.12, 78.02, 129
See application file for complete search history.

(56) References Cited

U.S. PATENT DOCUMENTS

| | | | |
|---|---|---|---|
| 6,038,108 A * | 3/2000 | Dee et al. | 360/121 |
| 6,771,456 B2 * | 8/2004 | Winarski et al. | 360/78.02 |
| 7,054,093 B1 * | 5/2006 | Anderson et al. | 360/75 |
| 7,342,738 B1 * | 3/2008 | Anderson et al. | 360/77.12 |
| 2003/0035248 A1 * | 2/2003 | Daby et al. | 360/317 |
| 2005/0122623 A1 * | 6/2005 | Dee | 360/129 |
| 2005/0259353 A1 * | 11/2005 | Magnusson | 360/121 |

* cited by examiner

*Primary Examiner* — Jefferson Evans
(74) *Attorney, Agent, or Firm* — Brooks Kushman P.C.

(57) ABSTRACT

A tape head assembly for writing data to and reading data from a tape includes a tape head member having an engagement surface that is configured to engage the tape as the tape moves past the tape head member. A plurality of arrays of interactive elements are supported on the engagement surface. Each array is longitudinally offset from each other array. Each individual array includes a read group having only read elements and a write group having only write elements. Each read group is laterally offset from each write group within each array.

20 Claims, 2 Drawing Sheets

TAPE HEAD LAYOUT HAVING OFFSET READ AND WRITE ELEMENT ARRAYS

BACKGROUND OF THE INVENTION

1. Field of the Invention

The invention disclosed herein relates to the field of arranging interactive elements on a tape head configured to read electronic data stored on tape media.

2. Background Art

Tape heads that are configured to read electronic data stored on tape media, for example, magnetic tapes, are known. Magnetic tape conventionally include a plurality of servo tracks and a plurality of data zones. The data zones are arranged longitudinally along the magnetic tape. The servo tracks are also arranged longitudinally on the magnetic tape and bound the data zones. For example, a conventional tape may include two data zones and three servo tracks, a first and a third servo track being laterally spaced apart along the magnetic tape with the two data zones disposed between the first and third servo tracks. The second servo track is disposed along the center of the magnetic tape separating the two data zones.

A conventional tape head includes a plurality of servo track sensors and a plurality of interactive elements. The interactive elements comprise read elements and write elements which respectively read data from, and write data to, the magnetic tape as the magnetic tape passes over the tape head. The interactive elements are disposed along an engagement surface of the tape head that is configured to engage the magnetic tape as the magnetic tape passes over the tape head. The interactive elements are disposed on the engagement surface between outer lying servo track sensors. The servo track sensors are spaced apart by a distance that corresponds to the distance between two consecutive servo tracks on the magnetic tape. The interactive elements are disposed between the servo track sensors and are spaced apart from one another by a substantially equal distance.

As the magnetic tape passes over the engagement surface of the tape head, the interactive elements can read data from, and write data to, the magnetic tape. As the magnetic tape moves past the tape head, it has a tendency to stray from a constant position in a lateral direction. The servo track sensors on the tape head detect the position of the servo tracks and, hence, detect lateral movement of the magnetic tape. The servo track sensors provide feedback to mechanisms that reposition the tape head to ensure that the interactive elements maintain a substantially constant lateral position with respect to the magnetic tape. In this manner, data tracks are deposited along the surface of the magnetic tape by the write elements at precisely known lateral position with respect to the servo tracks.

A conventional tape head includes two arrays of interactive elements longitudinally spaced apart from one another. Each array typically includes sixteen read/write pairs (only eight have been depicted for ease of illustration). Each read/write pair consists of a single read element and a single write element. The read and write elements in a single read/write pair are disposed on the tape head at substantially the same lateral position along the engagement surface. Each of the read elements in an array are aligned in a lateral column with each other. Similarly, each of the write elements within an array are laterally aligned in a column with one another and also substantially longitudinally aligned with their corresponding read elements. The longitudinal alignment of the read elements with the write elements of each read/write pair ensures the proper alignment of each read element and each write element with the data tracks on the magnetic tape. Further, the read/write pairs of each array are also longitudinally aligned with the read/write pairs of the other arrays. This arrangement permits the write elements of a first array to write data to the magnetic tape as it passes over the engagement surface and a corresponding read element from an adjacent second array to confirm that the data was written correctly as the magnetic tape passes downstream to the second array. The tape head can write and confirm data in the data tracks on the magnetic tape as the magnetic tape moves past the tape head in either a forward or reverse direction.

The tape head can move laterally to the second data zone. Once the tape head is positioned over the second data zone, the servo track sensors can detect the position of the second and third servo tracks and use them in the same manner that it detected and used the first and second servo tracks. Typically, the tape head will write data to the magnetic tape in one of the data zones as the magnetic tape moves in the forward direction. Then the tape head moves to the other data zone and writes to that data zone as the tape moves in the reverse direction.

The above described configuration can present some problems. First, the tape head needs to be capable of both very fine lateral adjustments as the magnetic tape moves past the engagement surface, and also very coarse adjustments as the tape head moves between data zones. The fine adjustments require the use of very flexible electric connectors because of the very high frequency of tape head adjustments and because of the very small dimensions of such adjustments (as small as 0.1 microns). However, as the tape head moves between data zones, it travels a distance of thousands of microns. Such long distance travel requires a far more robust electrical connection because of the increased wear and tear such motion causes. The goal of providing flexible electrical connectors needed for fine adjustment is antithetical to the goal of providing robust electrical connectors needed for coarse adjustment.

Another problem encountered by the configuration described above is that the magnetic tape, which is frequently comprised of a plastic substrate, is sensitive to changes in temperature and humidity. The dimensions of the substrate change in both the longitudinal and lateral directions as the plastic substrate expands and contracts thereby making it difficult for a tape head to properly align with the data tracks. Potential solutions to this problem include doubling the number of read/write pairs within a single data zone, or, alternatively positioning the same number of read/write pairs on only half of the engagement surface. Either solution would diminish the distance between read/write pairs which in turn, places the data tracks closer together. A reduction in distance between data tracks reduces the impact on the tape head of the expanding and contracting substrate. However, because of the complexity associated with manufacturing tape heads, simply doubling or otherwise increasing the number of read/write pairs between servo track sensors is problematic and undesirable. Also, positioning read/write pairs on only half of the engagement surface would render such a tape head incompatible with previously recorded magnetic tape on which data was recorded using a conventional tape head. The present invention addresses these and other problems.

SUMMARY OF THE INVENTION

A tape head assembly for writing data to, and/or reading data from a tape as the tape moves past the tape head assembly is disclosed herein. In a first embodiment, the tape head assembly comprises a tape head member having an engagement surface that is configured to engage the tape as the tape moves past the tape head member. A plurality of arrays of interactive elements are supported on the engagement surface. Each individual array is longitudinally offset from each other individual array. Each individual array has the read group including at least two read elements and no write elements, and a write group that includes at least two write elements and no read elements. Each read group is laterally offset from each write group within each array.

In at least one implementation of the first embodiment, each one of the arrays may have an equal number of the read groups and the write groups. Each of the arrays may have a sequence of the read groups and the write groups that is opposite to a sequence of the read groups and the write groups of a neighboring array. Each of the arrays may be aligned with the neighboring array such that each one of the read groups of each of the arrays is substantially longitudinally aligned with a corresponding one of the write groups of the neighboring array.

In at least another implementation of the first embodiment, each of the read groups and each of the write groups may contain an equal number of interactive elements and each individual interactive element within each array may be substantially equal distant from each of its neighboring interactive elements.

In at least another implementation of the first embodiment, each of the read groups and each of the write groups may contain sixteen interactive elements.

In another implementation of the first embodiment, each array may contain no more than one of the read groups and no more than one of the write groups.

In another implementation of the first embodiment, no more than two arrays of interactive elements may be supported on the engagement surface.

In at least a second embodiment, a tape head assembly is disclosed for writing data to and reading data from a tape as the tape moves past the tape head assembly, the tape having a plurality of laterally spaced apart servo tracks and a plurality of data zones, each data zone being disposed between two servo tracks. In this second embodiment, the tape head assembly includes a tape head member having an engagement surface that is configured to engage the tape as the tape moves past the tape head member. A plurality of arrays of interactive elements are supported on the engagement surface. Each individual array is longitudinally offset from each other individual array. Each individual array has a read group including at least two read elements and no write elements, a write group including at least two write elements and no read elements and two laterally spaced apart servo track sensors that are spaced apart by a distance substantially equal to the distance between two adjacent servo tracks on the tape. Each one of the read groups within each array is laterally adjacent to at least one of the write groups. Each one of the write groups within each array is laterally adjacent to at least one of the read groups. Each of the read groups and each of the write groups within each array is disposed between the two servo track sensors.

In a first implementation of the second embodiment, each one of the arrays may have an equal number of the read groups and the write groups. Each of the arrays may have a sequence of the read groups and the write groups that is opposite to a sequence of the read groups and the write groups of a neighboring array. Each of the arrays may be aligned with the neighboring array such that each one of the read groups of the array is substantially longitudinally aligned with a corresponding one of the write groups of the neighboring array.

In at least another implementation of the second embodiment, each of the read groups and each of the write groups may contain an equal number of interactive elements.

In at least a further implementation of the second embodiment, each of the read groups and each of the write groups may contain sixteen interactive elements.

In at least another implementation of the second embodiment, each array may contain no more than one of the read groups and no more than one of the write groups.

In at least another implementation of the second embodiment, no more than two arrays of interactive elements may be supported on the engagement surface.

In at least another implementation of the second embodiment, the distance between each of the individual interactive elements within each of the arrays may be between approximately 25 microns and 125 microns. In a variation of this implementation, the distance between each of the individual interactive elements within each of the arrays may be approximately 80 microns.

In at least a third embodiment, a tape head assembly is disclosed for writing data to, and reading data from a tape as the tape moves past the tape head assembly, the tape having a plurality of laterally spaced apart servo tracks and a plurality of data zones, each data zone being disposed between two servo tracks. In this third embodiment, the tape head assembly comprises a tape head member having an engagement surface that is configured to engage the tape as the tape moves past the tape head member. A plurality of arrays of interactive elements are supported on the engagement surface. Each individual array is longitudinally offset from each other individual array. Each individual array has a read group including at least two read elements and no write elements, a write group including at least two write elements and no read elements, and two laterally spaced apart servo track sensors that are spaced apart by a distance substantially equal to the distance between servo tracks. Each one of the read groups and each one of the write groups within each one of the arrays is laterally offset from each other and arranged in a laterally alternating sequence. Each one of the arrays spans a distance corresponding to the distance between outer servo tracks of two adjacent data zones.

In at least one implementation of the third embodiment, each one of the arrays may have a single read group and a single write group. The read group and the write group of at least one of the arrays may be separated from each other by one of the servo track sensors.

In at least another implementation of the third embodiment, each one of the arrays may have an equal number of the read groups and the write groups. Each of the arrays may have a sequence of the read groups and the write groups that is opposite to a sequence of the read groups and the write groups of a neighboring array. Further, each of the arrays may be aligned with the neighboring array such that each one of the read groups of each of the arrays is substantially longitudinally aligned with a corresponding one of the write groups of the neighboring array.

In at least another implementation of the third embodiment, each of the read groups and each of the write groups may contain an equal number of interactive elements.

In at least another implementation of the third embodiment, each of the read groups and each of the write groups may contain sixteen interactive elements.

In another implementation of the third embodiment, no more than two arrays of interactive elements may be supported on the engagement surface.

DETAILED DESCRIPTION OF THE PREFERRED EMBODIMENT(S)

Figure 1:
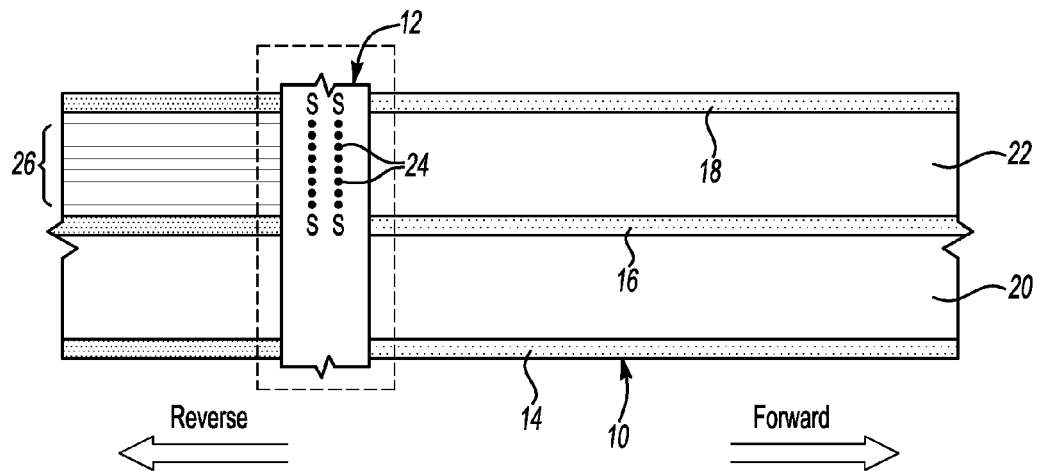
FIG. 1 is a schematic view illustrating a conventional tape head reading data from, and writing data to a tape.

Detailed embodiments of the present invention are disclosed herein. However, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. In some instances, more than one embodiment of an invention is illustrated and described. Parts and components of the additional embodiments that are similar or identical in function to corresponding parts of a first embodiment will be given the same reference numerals as those given to the first embodiment, but with either a prime notation or a letter designator after the reference numeral.

A tape head having various configurations of read elements and write elements is disclosed herein. The embodiments discussed below relate to tape heads that engage tape and that read data from, and write data to, the tape for use in computer systems, for instance in tape backup systems used to backup hard drives and other data storage devices. It should be understood that this invention is not limited to such usage but rather may be compatible with any system where the writing or reading of data to tape is employed. This system is also not limited to applications involving the recording of data to, or the reading of data from, magnetic tape, but rather, may be used together with any medium to which such data may be recorded or from which such data may be read.

With reference to FIG. 1, a schematic view is presented illustrating a segment of tape 10 and a conventional tape head 12. Tape 10 may be wound on reels (not shown) and run past tape head 12 to permit tape head 12 to engage tape 10 and read data from, or write data to tape 10. Tape 10 may run in both forward and reverse directions. As used with reference to FIG. 1, the forward direction refers to tape 10 moving towards the right side of FIG. 1 and the reverse direction refers to tape 10 movement to the left side of FIG. 1. As used throughout this document, the directional reference "longitude" or "longitudinal" refers to the direction of tape travel over tape head 12. The directional reference "lateral" or "laterally" refers to a direction that is perpendicular to the direction of tape travel and in the same plane as the tape.

A first servo track 14, a second servo track 16 and a third servo track 18 are disposed longitudinally along a surface of tape 10. The portions of tape 10 disposed between the three illustrated servo tracks are data zones for receiving magnetic data. In the illustrated embodiment, tape 10 includes a first data zone 20 and a second data zone 22.

The first, the second, and the third servo tracks 14, 16, and 18 are laterally spaced apart on the surface of tape 10 and each contains magnetic information used by tape head 12 to determine and maintain its lateral position with respect to tape 10. Tape head 12 includes a plurality of servo track sensors that detect the servo tracks as tape 10 passes over tape head 12. In FIG. 1, servo track sensors are identified generally by the letter "s". In the embodiment illustrated in FIG. 1, four servo track sensors are included on tape head 12. It should be understood that this schematic is for illustrative purposes only and that other tape heads may have a greater or lesser number of servo track sensors.

A plurality of interactive elements 24 are disposed between the two servo track sensors illustrated on tape head 12 in FIG. 1. The term "interactive elements" refers generally to both read elements and write elements that read electronic data from, and that write electronic data to tape 10, respectively. Each individual interactive element 24 is substantially equidistant from its neighboring interactive element 24. This spacing can vary from between 50 to 250 microns, depending on the number of interactive elements disposed between servo track sensors. As tape 10 moves past tape head 12 and as the individual interactive elements 24 write data into the first or second data zones 20, 22, the data written by each individual interactive elements 24 forms a data track longitudinally arranged in either the first or the second data zones. A plurality of parallel, longitudinally disposed data tracks 26 are illustrated in FIG. 1. In the illustrated embodiment, tape 10 is traveling in the reverse direction and data tracks 26 are visible in second data zone 22 to the left of tape head 12.

In order to properly read the data stored in data tracks 26, the data must be aligned with interactive elements 24 on tape head 12. To ensure proper alignment, the servo track sensors detect the location of the servo tracks on either side of a data zone and provide location data to mechanisms (not shown) which control the lateral movement of tape head 12. The mechanisms keep the individual interactive elements 24 properly aligned with the individual data tracks 26.

The individual interactive elements have a lateral dimension of approximately 10 microns. The spacing between the individual interactive elements 24 (50-250 microns) permits tape head 12 to dispose multiple, laterally off-set sets of data tracks within a data zone by laterally shifting tape head 12 by a distance less than the distance between interactive elements, for example, 10 microns. In view of the relatively large distances between interactive elements when compared with the size of the individual interactive elements, multiple sets of data tracks can be stored within a single data zone. The writing of data to, and the reading of data from multiple data tracks 26, which may be laterally offset from one another by as little as, for example, 10 microns, requires relatively precise control over the lateral movement of tape head 12 and requires relatively great precision in the positioning of tape head 12 with respect to tape 10.

Figure 2:
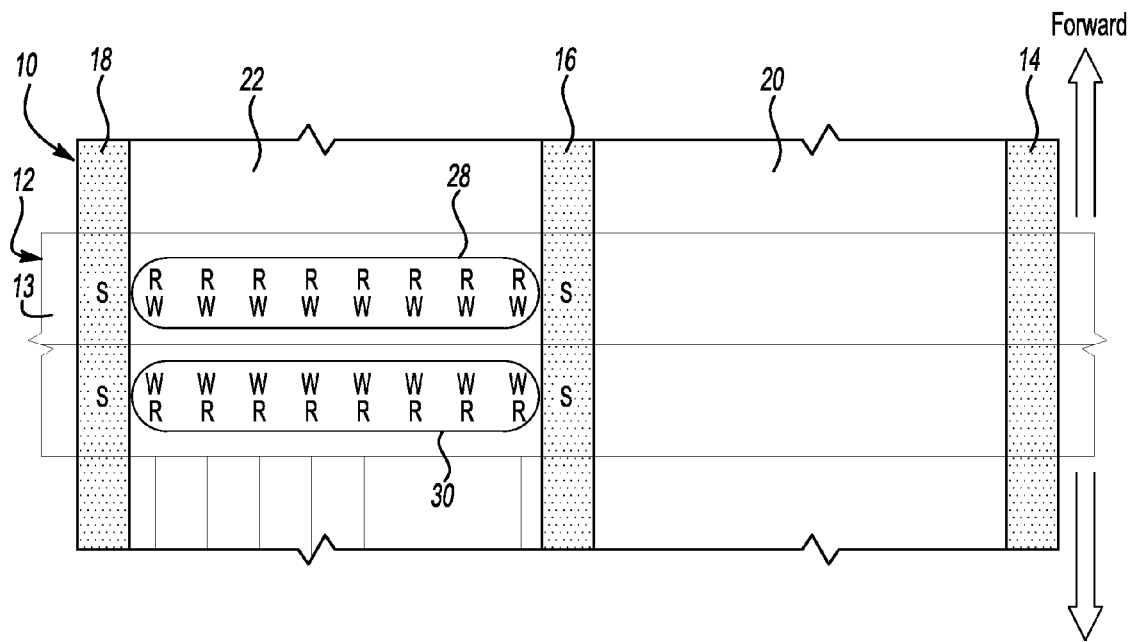
FIG. 2 is a schematic view illustrating an arrangement of interactive elements on a tape head and a segment of magnetic tape.

FIG. 2 illustrates an expanded schematic view of the portion of tape 10 and conventional tape head 12 illustrated indicated by the phantom line box in FIG. 1. For ease of illustration, the orientation of the expanded portions of tape 10 and tape head 12 have been rotated counterclockwise by 90°. In this view, it can be observed that tape head 12 includes a first array of interactive elements 28 and a second of interactive elements array 30 disposed on engagement surface 13 of tape head 12. First array 28 includes eight read elements and eight write elements, as does second array 30. It should be understood that this number of interactive elements 24 is merely exemplary. Other tape heads may have more or fewer interactive elements 24.

The interactive elements 24 of the first and second arrays 28, 30 are arranged as eight substantially equidistant, substantially laterally aligned read/write pairs. Each read/write pair includes a single read element and a single write element. Each read element of each array is substantially aligned laterally with each other read element within its array. Similarly, each write element of each array is substantially aligned laterally with each other write element within its array. Also, each read element is substantially aligned longitudinally with its corresponding write element within each read/write pair. Further, each interactive element within each array is substantially longitudinally aligned with a corresponding interactive element from the adjacent or neighboring array. In the illustrated embodiment, the read elements of array 28 are disposed above the write elements of array 28 while the read elements of array 30 are disposed below the write elements of array 30. In other embodiments, this sequence can be reversed. In still other embodiments, an alternating sequence may be implemented.

With the interactive elements of array 28 substantially longitudinally aligned with the interactive elements of array 30, tape head 12 is capable of writing data to tape 10 and substantially simultaneously confirming that the data is written correctly. For example, as tape 10 of FIG. 2 moves in the reverse direction (with respect to FIG. 2-4, the reverse direction refers to the bottom of the page and the forward direction refers to the top of the page), the write elements of array 28 may record data to tape 10. As that segment of tape 10 continues traveling in reverse, it passes by the read elements of array 30. Because the read elements of array 30 are longitudinally aligned with the write elements of array 28, the read elements of array 30 are able to confirm that the data was correctly recorded to tape 10 by the write elements of array 28.

Although FIGS. 1 and 2 illustrate a tape head 12 having only two arrays, with each array having eight read/write pairs, and further depicts tape 10 as having only three servo tracks and two data zones, it should be understood that tape head 12 may include more than two arrays and that each array may include more or fewer than eight read/write pairs. Similarly, it should be understood that tape 10 may include more than three servo tracks and more than two data zones.

The tape head illustrated in FIGS. 1 and 2 are prior art and are known in the industry. In various embodiments of the present invention, an array no longer includes read/write pairs. Rather, the read elements of each array have been separated from the write elements of each array. Thus, each array includes at least two laterally aligned groups of interactive elements including, a group of laterally aligned read elements exclusive of any write elements and a group of laterally aligned write elements exclusive of any read elements. The sequence of read groups and write groups for each adjacent array on the engagement surface alternates. For example, in the embodiment illustrated in FIG. 3, tape head 12 includes two arrays, 28' and 30'. Array 28' includes a single write group 32 including eight write elements and no read elements and a single read group 34 including eight read elements and no write elements. Adjacent array 30' includes a single read 36 group including eight read elements and no write elements and a single write group 38 including eight write elements and no read elements. The sequence of the read and the write groups 34, 32 of array 28' is the reverse of the sequence of the read and write groups 36, 38 of array 30'. The write elements of write group 32 are longitudinally aligned with the read elements of read group 36. This configuration permits read group 36 to verify the data recorded on tape 10 by write group 32 as tape 10 moves in the reverse direction (towards the bottom of the page). Similarly, read group 34 can verify the data recorded to tape 10 by write group 38 as tape 10 moves in the forward direction (toward the top of the page).

Figure 3:
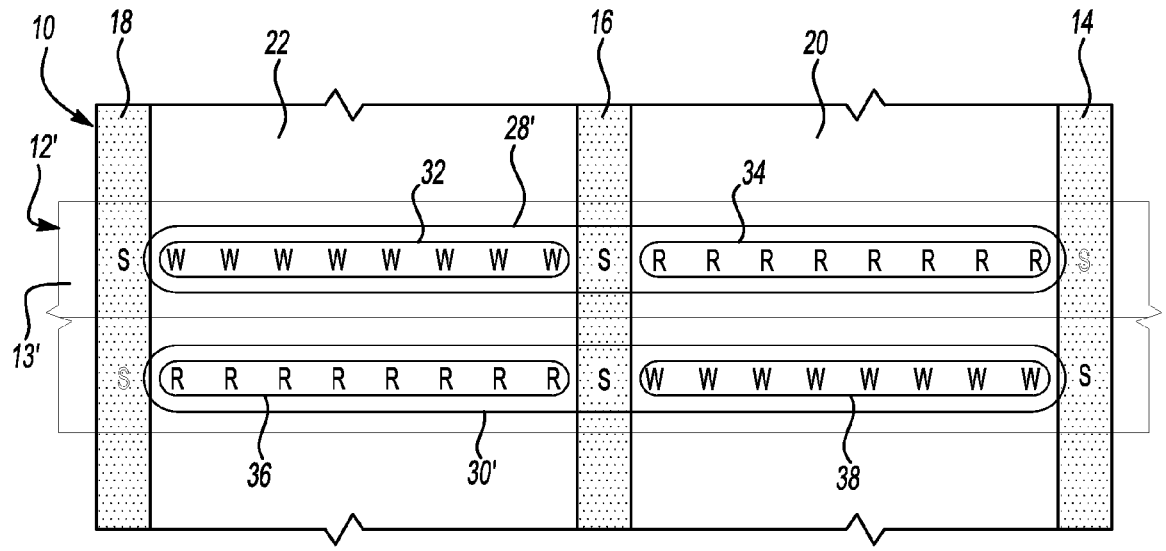
FIG. 3 is a schematic view illustrating a segment of tape and a configuration of interactive elements on a tape head made in accordance with a first embodiment of the present invention.

In the embodiment illustrated in FIG. 3, array 28' and array 30' each span the two data zones 20, 22. This configuration alleviates the need for tape head 12' to move laterally between adjacent data zones.

Tape head 12' includes six servo track sensors, two aligned with first servo track 14, two aligned with servo track 16, and two aligned with servo track 18. In this configuration, tape head 12' may use only those servo track sensors associated with the data zones being written to by tape head 12'. For instance, as tape 10 travels in the reverse direction, tape head 12' will write to the tape using the write group 32 will use the servo track sensors corresponding to servo tracks 16 and 18 to keep tape head 12' aligned with tape 10 as tape 10 moves past tape head 12'. When tape 10 is traveling in the forward direction, write group 38 will write to tape 10 in data zone 20 and tape head 12' will use the servo track sensors corresponding to servo tracks 14 and 16 to properly align tape head 12' with tape 10.

By spreading the interactive elements of arrays 28' and 30' across first and second data zones 20,22, tape head 12' may be manufactured with only four servo track sensors, the two shown in hollow may be unnecessary to properly align tape head 12' with tape 10.

Although tape head 12 is depicted as having two arrays, each array having a single read group and a single write group, it should be understood that a tape head may be configured as illustrated in FIG. 3 with more than two arrays and/or more than a single read group and/or more than a single write group without departing from the teachings of the present invention.

Figure 4:
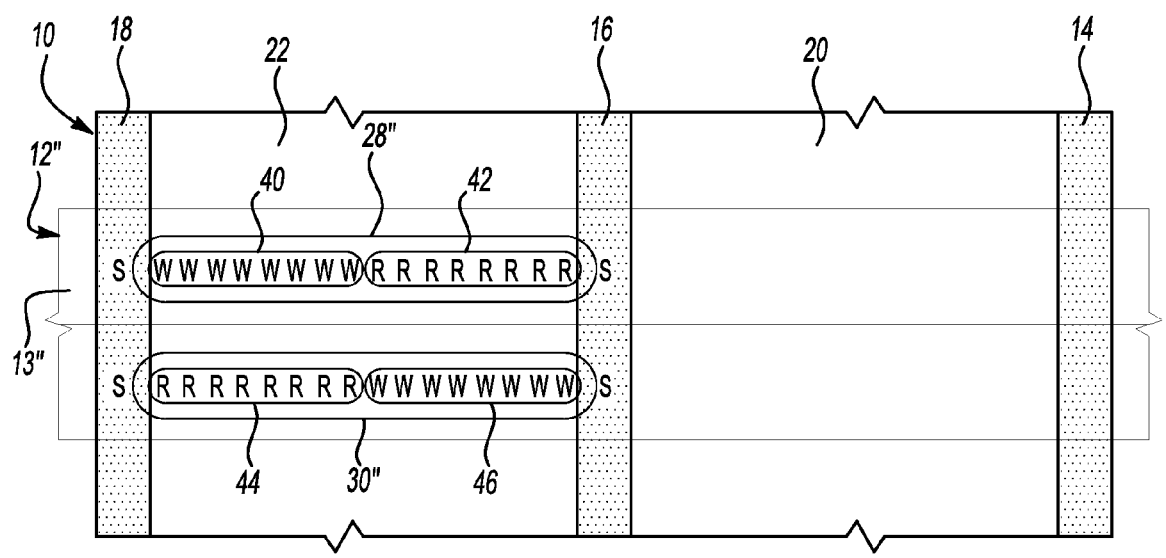
FIG. 4 is a schematic view illustrating a segment of tape and a configuration of interactive elements on a tape head made in accordance with a second embodiment of the present invention.

FIG. 4 illustrates a second embodiment of the present invention. In this embodiment, tape head 12" includes a first array 28" and a second array 30". As in the first embodiment, here, again, the write elements of each array have been grouped together exclusive of any read elements and the read elements of each array have been grouped together exclusive of any write elements. Array 28" includes a write group 40 and a read group 42 and array 30" includes a read group 44 and a write group 46. Also, each write group and the read group are disposed adjacent to one another and laterally aligned along the engagement surface 13" of tape head 12". Also, the sequence of read and write groups of array 28" is the reverse of the sequence of the read and write groups of array 30". As illustrated in FIG. 4, the laterally aligned read and write groups of each array have been disposed between the servo track sensors and are configured to fit within a single data zone.

By separating the read elements from the write elements and by laterally aligning the read group and the write group of each array between two consecutive servo track sensors, the space between individual interactive elements is approximately half that between the individual interactive elements of either of the first embodiment of the present invention or of the prior art tape head configuration. By reducing the space between the individual interactive elements of arrays 28" and 30", tape head 12" is less susceptible to the dimensional changes of tape 10 caused by changes in temperature and atmospheric conditions. In this configuration, write group 40 would write data to only one-half of the space available in data zone 22. As configured in FIG. 4, the left half of data zone 22 would be written to by write group 40 as tape 10 moves in the reverse direction (towards the bottom of the page) while write group 46 would write data to the right half of the tape in data zone 22 as tape 10 moves in the forward direction (towards the top of the page). When data zone 22 becomes filled with data, tape head 12" could move to data zone 20 and repeat the process.

The individual interactive elements of arrays 28" and 30" of tape head 12" are disposed between 25 and 125 microns from one another. In other embodiments, the distance between the individual elements may be 80 microns. Additionally, while the second embodiment illustrated in FIG. 4 has cut the distance between individual interactive elements in half, the space between individual interactive elements may be reduced by any fractional amount and still achieve the benefits of the present invention. In such instances, additional arrays of interactive elements may be needed to cover the distance between lateral ends of a single data zone.

In the second embodiment illustrated in FIG. 4, not only does the depicted configuration address the concerns of the changing dimensions of tape 10, but this configuration also permits tape head 12" to read data that was recorded using prior art tape heads. Alternate read elements from read group 42 and read group 44 are disposed in a lateral location along tape head 12" that corresponds with the data tracks recorded to a tape using a conventional or prior art tape head. In this manner, the second embodiment illustrated in FIG. 4 is fully backward read compatible with earlier recorded tapes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape head assembly for writing data to, and/or reading data from a tape as the tape moves past the tape head assembly, the tape head assembly comprising:
   a tape head member having an engagement surface configured to engage the tape as the tape moves past the tape head member; and
   a plurality of arrays of interactive elements supported on the engagement surface, each individual array being longitudinally offset from each other individual array, each individual array having a read group including at least two read elements and no write elements, and a write group including at least two write elements and no read elements, each read group being laterally offset from each write group within each array, wherein the distance between each of the individual interactive elements within each of the arrays is between approximately 25 microns and 125 microns.

2. The tape head assembly of claim 1 wherein each one of the arrays has a number of the read groups that is equal to the number of the write groups and wherein each of the arrays has a sequence of the read groups and the write groups that is opposite to a sequence of the read groups and the write groups of a neighboring array and wherein each of the arrays is aligned with the neighboring array such that each one of the read groups of each of the arrays is substantially longitudinally aligned with a corresponding one of the write groups of the neighboring array.

3. The tape head assembly of claim 1 wherein each of the read groups and each of the write groups contain an equal number of interactive elements and wherein each individual interactive element within each array is substantially equidistant from each of its neighboring interactive elements.

4. The tape head assembly of claim 1 wherein each of the read groups and each of the write groups contain 16 interactive elements.

5. The tape head assembly of claim 1 wherein each array contains no more than one of the read groups and no more than one of the write groups.

6. The tape head assembly of claim 1 wherein no more than two arrays of interactive elements are supported on the engagement surface.

7. A tape head assembly for writing data to and/or reading data from a tape as the tape moves past the tape head assembly, the tape having a plurality of laterally spaced apart servo tracks and a plurality of data zones, each data zone being disposed between two servo tracks, the tape head assembly comprising:
   a tape head member having an engagement surface configured to engage the tape as the tape moves past the tape head member; and
   a plurality of arrays of interactive elements supported on the engagement surface, each individual array being longitudinally offset from each other individual array, each individual array having a read group including at least two read elements and no write elements, a write group including at least two write elements and no read elements, and two laterally spaced apart servo track sensors that are spaced apart by a distance substantially equal to the distance between two adjacent servo tracks on the tape, each one of the read groups within each array being laterally adjacent at least one of the write groups, each one of the write groups within each array being laterally adjacent at least one of the read groups, and each of the read groups and each of the write groups within each array being disposed between the two servo track sensors, wherein the distance between each of the individual interactive elements within each of the arrays is between approximately 25 microns and 125 microns.

8. The tape head assembly of claim 7 wherein each one of the arrays has an equal number of the read groups and the write groups and wherein each of the arrays has a sequence of the read groups and the write groups that is opposite to a sequence of the read groups and the write groups of a neighboring array and wherein each of the arrays is aligned with the neighboring array such that each one of the read groups of each of the arrays is substantially longitudinally aligned with a corresponding one of the write groups of the neighboring array.

9. The tape head assembly of claim 7 wherein each of the read groups and each of the write groups contain an equal number of interactive elements.

10. The tape head assembly of claim 7 wherein each of the read groups and each of the write groups contain 16 interactive elements.

11. The tape head assembly of claim 7 wherein each array contains no more than one of the read groups and no more than one of the write groups.

12. The tape head assembly of claim 7 wherein no more than two arrays of interactive elements are supported on the engagement surface.

13. The tape head assembly of claim 7 wherein the distance between each of the individual interactive elements within each of the arrays is approximately 80 microns.

14. A tape head assembly for writing data to and/or reading data from a tape as the tape moves past the tape head assembly, the tape having a plurality of laterally spaced apart servo tracks and a plurality of data zones, each data zone being disposed between two servo tracks, the tape head assembly comprising:

a tape head member having an engagement surface configured to engage the tape as the tape moves past the tape head member; and a plurality of arrays of interactive elements supported on the engagement surface, each individual array being longitudinally offset from each other individual array, each individual array having a read group including at least two read elements and no write elements, a write group including at least two write elements and no read elements, and two laterally spaced apart servo track sensors that are spaced apart by a distance substantially equal to the distance between servo tracks, each one of the read groups and each one of the write groups within each one of the arrays being laterally offset from each other and arranged in a laterally alternating sequence, and each one of the arrays spanning a distance corresponding to the distance between outer servo tracks of two adjacent data zones, wherein the distance between each of the individual interactive elements within each of the arrays is between approximately 25 microns and 125 microns.

15. The tape head assembly of claim 14 wherein each one of the arrays has a single read group and a single write group and wherein the read group and the write group of at least one of the arrays are separated from each other by one of the servo track sensors.

16. The tape head assembly of claim 14 wherein each one of the arrays has a number of the read groups that is equal to the number of the write groups and wherein each of the arrays has a sequence of the read groups and the write groups that is opposite to a sequence of the read groups and the write groups of a neighboring array and wherein each of the arrays is aligned with the neighboring array such that each one of the read groups of each array is longitudinally aligned with a corresponding one of the write groups of the neighboring array.

17. The tape head assembly of claim 14 wherein each of the read groups and each of the write groups contain an equal number of interactive elements.

18. The tape head assembly of claim 14 wherein each of the read groups and each of the write groups contain 16 interactive elements.

19. The tape head assembly of claim 14 wherein no more than two arrays of interactive elements are supported on the engagement surface.

20. The tape head assembly of claim 14 wherein the distance between each of the individual interactive elements within each of the arrays is approximately 80 microns.

* * * * *